Dec. 5, 1967 R. C. CASANOV 3,356,393

METHOD OF AND DEVICE FOR KEYING MEMBERS TOGETHER

Filed April 6, 1965

INVENTOR
RAYMOND C. CASANOV

BY *O. F. Kane*

ATTORNEY

United States Patent Office 3,356,393
Patented Dec. 5, 1967

3,356,393
METHOD OF AND DEVICE FOR KEYING
MEMBERS TOGETHER
Raymond C. Casanov, Chicago, Ill., assignor to Teletype
Corporation, Skokie, Ill., a corporation of Delaware
Filed Apr. 6, 1965, Ser. No. 446,064
2 Claims. (Cl. 287—52.08)

ABSTRACT OF THE DISCLOSURE

A device for forming a driving connection between telescoped parts without exerting a thrust on the inner of the parts including a key positioned in a notch in the inner one of the parts and in a hole in the outer one of the parts and a set screw bottomed in a blind, threaded hole in the key and in a threaded extension of the hole in the outer of the two parts for affixing the key to the outer of the parts without exerting a thrust on the inner of the parts.

---

This invention relates to drive connections and a method of manufacturing such connections and more particularly to a key for keying members together and a method of making a keyed connection between members.

In some forms of machinery, such for example as automatic screw machines, it is required that telescoped members be fixed one to the other for rotation as a unit wherein the inner member slidably and/or rotatably receives a shaft or spindle. With such an arrangement of parts, any deformation of the inner member will cause interference with the movement of the shaft or spindle within it.

It is therefore an object of the present invention to provide a drive connection between a pair of members at least one of which is a tubular member and a method of forming such a connection.

Another object of this invention is to key one tubular member to a shaft member without distorting either the tubular member or the shaft member.

It is a further object of this invention to provide a drive connection for connecting a tubular member to a tubular shaft and a method of making such a drive connection.

In the preferred embodiment the present invention is used to interconnect a pair of tubular members. An outer tubular member is positioned in the desired location with respect to the inner tubular member and a slot is thereupon milled through the outer tubular member and into but not through the inner tubular member thereby forming a hole in the outer member and notch in the inner member. A keying element comprising a short length of round edged, flattened wire of a size which completely fills the milled slots in the two members is then positioned in the slots and a hole is drilled and tapped in the keying element and in the outer tubular member which is of a size such that a set screw of a diameter greater than the width of the keying element may be threaded and bottomed into the keying member. Preferably the diameter of the tapped hole and consequently the diameter of the set screw are such that the threaded hole is divided into four approximately 90° sectors, two of which are formed 180° apart in the key and the other two formed 180° apart in the outer tubular member. When the set screw is threaded into this tapped hole and is bottomed in the keying member it will be self-locking. Thus the set screw, since it is threaded into both the keying member and tubular member, will apply practically no radial thrust against the inner tubular member.

A more complete understanding of the invention may be had by reference to the following detailed description when considered in conjunction with the accompanying drawings wherein.

Figure 1:
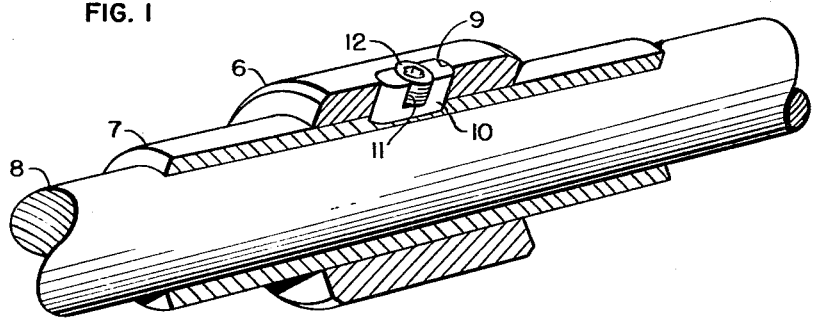
FIG. 1 is a fragmentary view in perspective of a drive connection made in accordance with the present invention and showing a pair of tubular members and a key locking the two members together.
Figure 2:
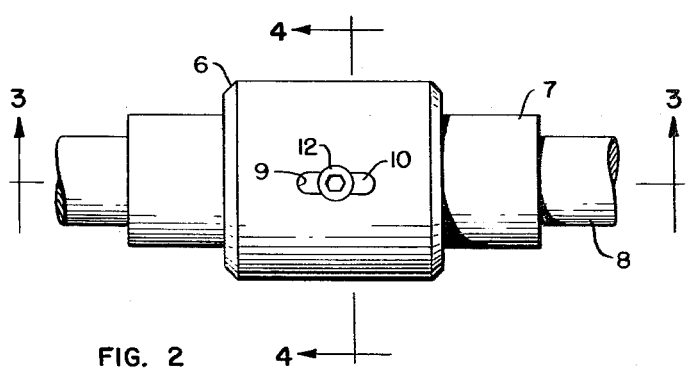
FIG. 2 is a top view of the device shown in FIG. 1.
Figure 4:
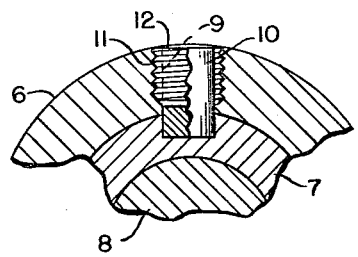
FIG. 4 is a sectional view taken along the line 4—4 of FIG. 2 in the direction of the arrows.
Figure 3:
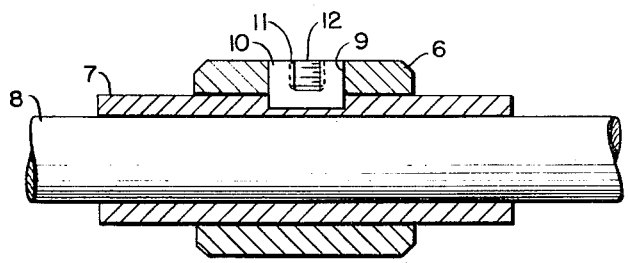
FIG. 3 is a sectional view taken substantially along the line 3—3 of FIG. 2 in the direction of the arrows.

By reference to the drawings wherein like reference characters designate the same parts throughout the several views it will be seen that the drive connection serves to connect a pair of tubular members 6 and 7 that are rotatably and/or slidably mounted on a shaft 8. The tubular member 6 may be a hub or shouldered member which is to be fixed to the tubular member 7. The method for connecting the tubular members 6 and 7 comprises arranging the member 6 on the member 6 in the desired location and while holding the two members 6 and 7 in the desired position, milling a slot 9 completely through the member 6 and part way through the wall of the member 7. After this slot is milled, a key 10 which completely fills the slot 9 is inserted therein and positioned so that its inner or bottom surface rests on the base of the slot 9 in the tubular member 7 and its outer surface is flush with the outer surface of the tubular member 6. When the key 10 is in position in the slot 9 a threaded hole 11 is formed in the key 10 and tubular member 6 by a drilling and tapping operation. The threaded hole 11 is a blind hole that extends through or part way through the tubular member 6 and part way through the key 10 and is of a diameter slightly larger than the width of the slot 9 whereby when the drilling and tapping operation is performed the hole 11 being larger than the slot 9 will extend over into the walls of the slot 9 and both the key and tubular member 6 will have threads formed in them in the tapping operation.

A set screw 12 is then threaded into the threaded hole 11 and bottomed at the end of the blind hole 11 of the key 10 in which position the outer surface of the set screw 12 will be substantially flush with the outer surface of the tubular member 6. Preferably, the diameter of the set screw is one and one-half times as large as the thickness of width of the key and extends about ⅔ of the length of the key. Also, preferably the width of the key and the diameter of the set screw should be such that the thread in the key 10 and tubular sleeve 6 will be divided into four substantially equal sectors, two of these sectors being formed 180° apart in the key and the other two sectors being formed 180° apart in the tubular sleeve 6. When this connection is made and the set screw is tightened down to the point where it bottoms in the key it will become self-locking and further since about one-half of the threads of the set screw are threadedly engaged in the threads in the tubular member, the key will be locked in all directions without pressing on or distorting the tubular member 7. This eliminates any tendency of the drive connection between the sleeve from interfering with the free movement of the shaft 8 on which the sleeve 7 is mounted.

Although a particular embodiment of the invention is shown in the drawings and described in the foregoing specification it will be understood that the invention is not limited to that specific embodiment, but is capable of modification and rearrangement, and substitution of parts and elements without departing from the scope of the invention.

What is claimed is:
1. A drive connection for a cylindrical member having a notch formed in its cylindrical surface and a tube having a partially threaded hole formed radially through it and positioned in telescoping engagement over the cylindrical member including:

a key having a blind threaded hole formed part way through it positioned in the hole through the tubular member and extending into and bottomed on the notch in the cylindrical member; and a screw positioned in the hole through the tubular member in engagement with the threads thereof and bottomed in the hole in the key in engagement with the threads of the key for securing the key in the hole through tubular member and thereby securing the key in the notch in the cylindrical member without imposing thrust on the cylindrical member.

2. A drive connection as defined in claim 1 wherein the comparative sizes of the threaded portions of the hole through the tube and the key member are such that the threads in the key member and tube form four substantially equal sectors, two of the sectors being 180° apart on the key.

References Cited

UNITED STATES PATENTS

| | | | |
|---|---|---|---|
| 268,058 | 11/1882 | Walrath | 287—52.08 X |
| 2,010,451 | 8/1935 | Browning | 287—52.05 |
| 2,196,032 | 4/1940 | Schmitt. | |
| 2,386,824 | 10/1945 | Tinnerman. | |
| 2,585,577 | 2/1952 | Nielson | 85—155 |

CARL W. TOMLIN, *Primary Examiner.*

A. V. KUNDRAT, *Assistant Examiner.*